US007213200B2

(12) United States Patent
Abe et al.

(10) Patent No.: US 7,213,200 B2
(45) Date of Patent: May 1, 2007

(54) SELECTABLE METHODS FOR GENERATING ROBUST XPATH EXPRESSIONS

(75) Inventors: Mari Abe, Kanagawa (JP); Scott D. DeWitt, Cary, NC (US); Masahiro Hori, Kanagawa-ken (JP); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 10/127,916

(22) Filed: Apr. 23, 2002

(65) Prior Publication Data

US 2004/0205577 A1 Oct. 14, 2004

(51) Int. Cl.
*G06F 17/00* (2006.01)
*G06F 9/45* (2006.01)
(52) U.S. Cl. .................. 715/513; 715/523; 717/143
(58) Field of Classification Search ................ 715/513; 707/3; 717/143
See application file for complete search history.

(56) References Cited

U.S. PATENT DOCUMENTS

| 6,535,896 B2* | 3/2003 | Britton et al. ............... 715/523 |
| 6,715,129 B1* | 3/2004 | Hind et al. .................. 715/513 |
| 6,785,673 B1* | 8/2004 | Fernandez et al. ............. 707/3 |
| 2002/0052895 A1* | 5/2002 | Keating ....................... 707/514 |
| 2002/0054090 A1* | 5/2002 | Silva et al. .................. 345/747 |
| 2002/0143816 A1* | 10/2002 | Geiger et al. ............... 707/513 |
| 2002/0184521 A1* | 12/2002 | Lucovsky et al. .......... 713/200 |

(Continued)

FOREIGN PATENT DOCUMENTS

GB 2364802 * 6/2002

(Continued)

OTHER PUBLICATIONS

Chang et al., "Efficient Filtering of XML Documents with XPath Expressions", Proceedings of the 18th International Conference of Data Engineering, IEEE, Mar. 2002, pp. 235-244.*

(Continued)

*Primary Examiner*—Heather R. Herndon
*Assistant Examiner*—Maikhanh Nguyen
(74) *Attorney, Agent, or Firm*—Jerry W. Herndon, Esq.; Steven M. Greenberg, Esq.; Carey, Rodriguez, Greenberg & Paul, LLP (57) ABSTRACT

A method and system for generating robust XPath expressions for a selected node in transcodable markup. The system of the invention can include a set of differing XPath expression generators; an interface through which at least one of the XPath expression generators can be selected; and, an XPath generator processor configured to apply each of the selected XPath expression generators to the selected node in the transcodable markup to produce a redundant set of robust XPath expressions configured to identify the selected node. Notably, the system also can include an XPath resolution processor. The XPath resolution processor can resolve each XPath expression in the redundant set. The resolutions, in turn, can identify a set of candidate nodes, the XPath resolution processor identifying the selected node from among the set of candidate nodes based upon the XPath expressions resolving to the selected node more than any other node in the set of candidate nodes.

11 Claims, 6 Drawing Sheets

U.S. PATENT DOCUMENTS

| | | | |
|---|---|---|---|
| 2003/0018668 A1* | 1/2003 | Britton et al. | 707/513 |
| 2003/0120978 A1* | 6/2003 | Fabbrizio et al. | 714/38 |
| 2003/0149934 A1* | 8/2003 | Worden | 715/513 |
| 2003/0163285 A1* | 8/2003 | Nakamura et al. | 702/179 |
| 2003/0237046 A1* | 12/2003 | Parker et al. | 715/513 |

FOREIGN PATENT DOCUMENTS

| | | | |
|---|---|---|---|
| WO | 01/90873 | * | 11/2001 |

OTHER PUBLICATIONS

Aaron Skonnard, "The XML files: Addressing Infosets with XPath", MSDN Magazine, Jul. 2000, pp. 1-9.*

C. Chan et al., "Efficient Filtering of XML Documents with XPath Expressions", IEEE Computer Society, Mar. 2002, pp. 1-10.*

Nagao et al. "Web Engineering—Semantic Annotation and Transcoding: Making Web Content More Accessible", IEEE, 2001,pp. 69-81.*

Asakawa et al., "Annotation-Based Transcoding for Novisual Web Access", ACM, Nov. 2000, pp. 172-179.*

Smith et al., "Transcoding Internet Content for Heterogeneous Client Devices," IEEE Int. Conf. on Circuits and System, May 1998, pp. 1-4.*

Takagi et al., "Transcoding Proxy for Nonvisual Web Access," ACM, Nov. 2000, pp. 164-171.*

Huang et al., "A Semantic Transcoding System to Adapt Web Services for Users with Disabilities," Nov. 2000, pp. 156-163.*

Hori et al, "Robustness of External Annotation for Web-Page Clipping: Empirical Evaluation with Evolving Real-Life Web Documents," ACM, 2000, pp. 1-8.*

J. Clark and S. DeRose, XML Path Language (Xpath) Version 1.0, *W3C Recommendation*, <http://www.w3.org/TR/xpath>, Nov. 16, 1999.

XML Authoring Tool: Freedom, *IBM Corporation Research*, <http://www.tri.ibm.com/projects/freedom/index_e.htm>, (Jan. 4, 2002).

M. Hori, G. Kondoh, K. Ono, S. Hirose and S. Singhal, *Annotation-Based Web Content Transcoding*, Proceedings of the 9th World Wide Web Conference (WWW-9), <http://www9.org/w9cdrom/169/169.html>, (Jan. 4, 2002).

M. Abe and M. Hori, A Visual Approach to Authoring Xpath Expressions, *Extreme Markup Languages 2001*, <http://ares.trl.ibm.com/freedom/doc/extml2001/abe0114.html>, (Jan. 18, 2002).

* cited by examiner

FIG. 4

SELECTABLE METHODS FOR GENERATING ROBUST XPATH EXPRESSIONS

This application is related to U.S. patent application Ser. No. 10/127973, entitled "Generating and utilizing robust XPATH expressions", filed Apr. 23, 2002; and U.S. patent application Ser. No. 10/128474, entitled "Anchoring method for computing an XPath expression", filed Apr. 23, 2002, which is incorporated herein by reference for all purposes in theirs entirety.

BACKGROUND OF THE INVENTION

1. Statement of the Technical Field

The present invention relates to the field of Web content transcoding and more particularly to generating XPATH expressions.

2. Description of the Related Art

End-users increasingly access Web content with devices other than conventional desktop content browsers. Such devices include personal digital assistants, cellular telephones and cable television set top boxes. Yet, as these devices lack the same rendering capabilities as the conventional desktop content browser, it is necessary to adapt the Web content from one format intended for use in one type of device, to a another format suitable for rendering in another device. This content adaptation process has been referred to as "transcoding".

The transcoding process can be facilitated through the use of information about the Web content, referred to hereinafter as "meta-information". Meta-information can be provided with the original Web content and can be used to assist the transcoding process in uniquely identifying portions of the Web content. Notably, meta-information can be created without any modification of the original Web content if the meta information is described separately from the Web content. In this regard, the separate provision of such meta-information often is referred to as "external annotation".

External annotations consist of the meta-information and corresponding references to portions of the original Web content. The meta-information and references typically are described according to the Resource Description Framework (RDF) and the XML Path/Pointer (XPath/XPointer) specification. XPath is a syntax for identifying particular sections of markup, such as an HTML or XML formatted document. Each of the RDF and XPath/XPointer specifications have been standardized by the World Wide Web Consortium, referred to hereafter as the "W3C".

XPath, described in depth in James Clark and Steve DeRose, XML Path Language (XPath) Version 1.0, W3C Recommendation (Nov. 16, 1999), arose from an effort to provide a common syntax and semantics for functionality which is shared between Extensible Style Sheet Transformations (XSLT) and XPointer. A primary purpose of XPath is to address parts of an XML document in support of which XPath provides basic facilities for manipulating strings, numbers and boolean values. XPath uses a compact, non-XML syntax to facilitate the use of XPath technology within Universal Resource Indicators (URI) and an XML attribute value. XPath operates on the abstract, logical structure of an XML document, rather than its surface syntax. Thus, XPath is aptly named in view of its URL-like path notion for navigating through the hierarchical structure of an XML document.

Notably, XPath expressions can be difficult to create. The XPath standard syntax requires an understanding of complex concepts, including multiple axes and predicates. As will be recognized by one skilled in the art, the XPath syntax plainly is unusual and non-intuitive. Importantly, though creating simplistic XPath expressions can be problematic, creating robust XPath expressions which remain valid notwithstanding changing portions of referenced markup can be even more so problematic. In particular, conventional XPath creation techniques are not configured to handle changing content relied upon as a reference point in associated markup.

For example, the structure and content of hypertext markup language (HTML) documents are known to change with time as the information contained in the HTML document sometimes can be updated hourly or daily. As the contents and structure of the document changes, however, associated annotations which uniquely identify those changed portions of the HTML document can become invalid. This can be particularly true where specific annotations uniquely identify portions of the changing HTML document by reference to a specific document structure. Hence, conventional annotation methods are ineffective in the face of a dynamically changing document.

SUMMARY OF THE INVENTION

The present invention is a method and system for generating robust XPath expressions for a selected node in transcodable markup. The system can include a set of differing XPath expression generators; an interface through which at least one of the XPath expression generators can be selected; and, an XPath generator processor configured to apply each of the selected XPath expression generators to the selected node in the transcodable markup to produce a redundant set of robust XPath expressions configured to identify the selected node. Notably, the system also can include an XPath resolution processor. The XPath resolution processor can resolve each XPath expression in the redundant set. The resolutions, in turn, can identify a set of candidate nodes, the XPath resolution processor identifying the selected node from among the set of candidate nodes based upon the XPath expressions resolving to the selected node more than any other node in the set of candidate nodes.

In a preferred aspect of the present invention, the set of differing XPath expression generators can include at least one of a tag-specific XPath expression generator, an anchoring XPath expression generator, and a cascading filtering XPath expression generator. In addition, the set of differing XPath expression generators can be incorporated in a visual authoring tool configured to create annotations to the transcodable markup. Finally, the XPath resolution processor can be coupled to a transcoding proxy configured to transcode transcodable markup based upon annotations including the redundant set of robust XPath expressions.

A method of generating robust XPath expressions can include the steps of: selecting a node in transcodable markup; further selecting at least two XPath expression generation methods, each method having a configuration for producing XPath expressions which uniquely identify nodes in transcodable markup; and, generating a redundant set of XPath expressions for the selected node using the further selected XPath expression generation methods. The method further can include resolving each XPath expression in the set, the resolutions producing a set of candidate nodes; and, identifying the selected node from among the set of candidate nodes based upon the XPath expressions in the set resolving to the selected node more than any other node in the set of candidate nodes.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for selecting differing methods for generating and using robust XPath expressions. In accordance with the present invention, multiple XPath expression generation methods can be combined to generate a set of XPath expressions which can redundantly identify a particular node in transcodable markup. The methods can include both tag specific methods and general methods for identifying the node. Individual combinations of the tag specific and general methods can be selected for use in generating the set of XPath expressions. Once the XPath expressions have been generated, a run-time XPath expression resolution process can select a node most likely referred to by the XPath expressions in the set. In this way, XPath expressions referring to the particular node can remain viable, notwithstanding changes to the transcodable markup.

Figure 1:
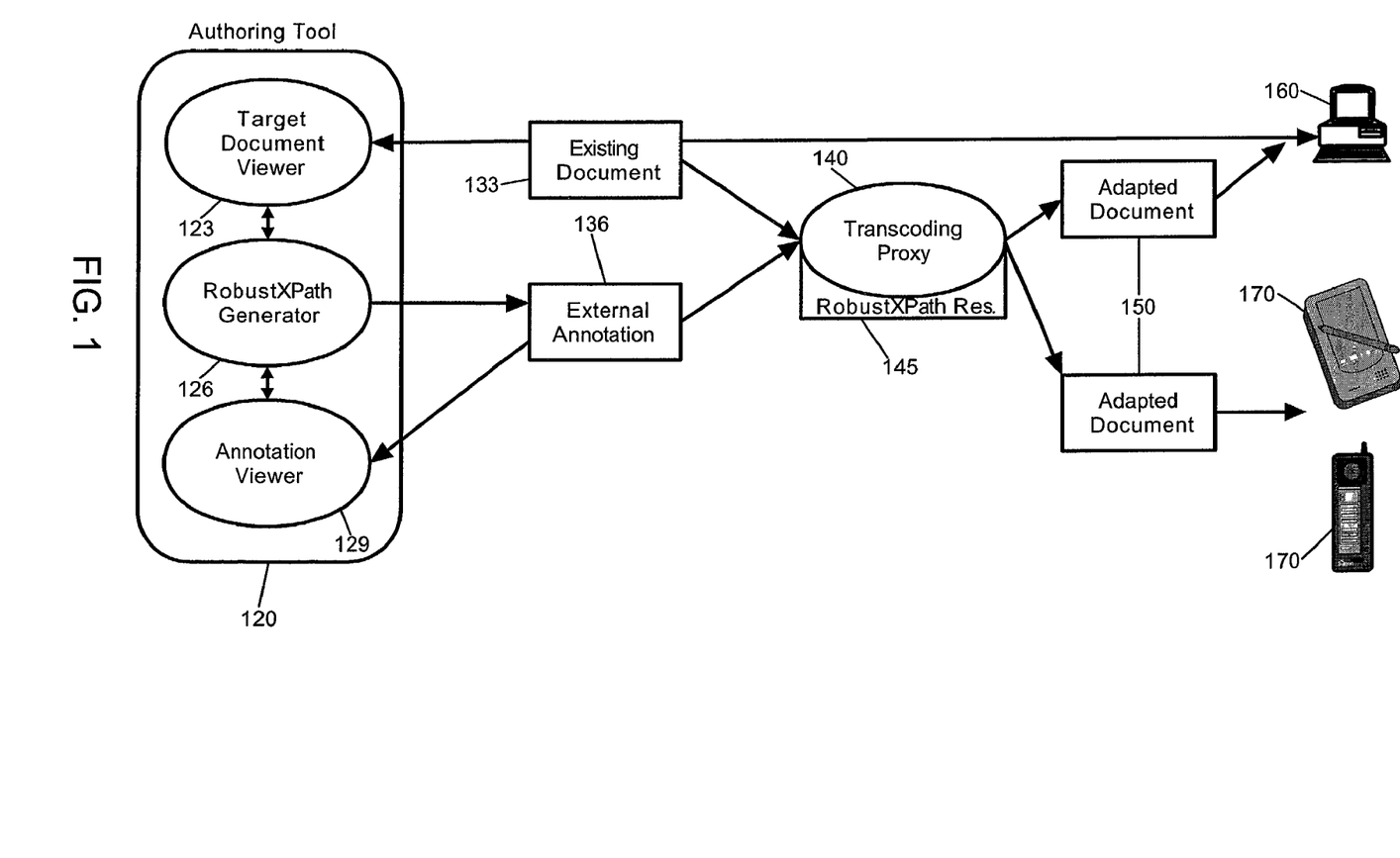
FIG. 1 is a pictorial illustration of a content transcoding system configured to generate and use robust XPath expressions in accordance with the inventive arrangements.

FIG. 1 is a pictorial illustration of a content transcoding system configured to generate and use robust XPath expressions. The system can include an authoring tool 120 which can be used to annotate existing transcodable content 133 configured for presentation in a particular computing platform 160, for instance a personal computer content browser. A transcoding proxy 140 can process the existing document 133, in combination with an external annotation 136 created by the authoring tool 120 to produce an adapted document 150 which can be presented in other computing platforms 170, for instance in a pervasive device microbrowser.

The authoring tool 120 can include a target document viewer 123, an annotation viewer 129 and a robust XPath expression generator 126. The target document viewer 123 can be used to present the markup in an existing document 133. The annotation viewer, by comparison, can be used to present the external annotation 136 produced in reference to the existing document 133. Finally, the robust XPath expression generator 126 can be used to generate a set of XPath expressions for a selected node in the existing document 133 using selected XPath expression generation methodologies. In particular, the XPath expression generator 126 can present a list of available XPath generation methods, including both tag specific and general XPath expression generation methods. Based upon an end-user selection, XPath expression generator 126 can generate the set of XPath expressions using only those selected XPath expression generation methodologies.

A run-time XPath expression resolution process 145 included in association with the transcoding proxy 140 can identify the selected node most likely referred to by the XPath expressions in the generated set during the transcoding process. Importantly, the run-time XPath expression resolution process 145 can identify the node, even where some of the XPath expressions in the set no longer validly refer to the selected node. Hence, the redundancy provided by the set of XPath expressions can result in the valid identification of a selected node notwithstanding changes to the transcodable markup.

Notably, the invention is not limited to the precise instrumentalities illustrated in FIG. 1. In particular, inasmuch as the present invention is a selectable method for generating robust XPath expressions, a visual authoring tool is not required. Rather, any tool for authoring external annotations, whether visual or otherwise, can suffice as a platform with which a set of robust XPath expressions can be generated for a selected node. Moreover, while the present invention includes a coupling of both generation-time and run-time methods, any actual method of presenting transcoded content can suffice so long as the run-time methodology suitably identifies the selected node based upon the robust XPath expressions in the set.

Figure 2:
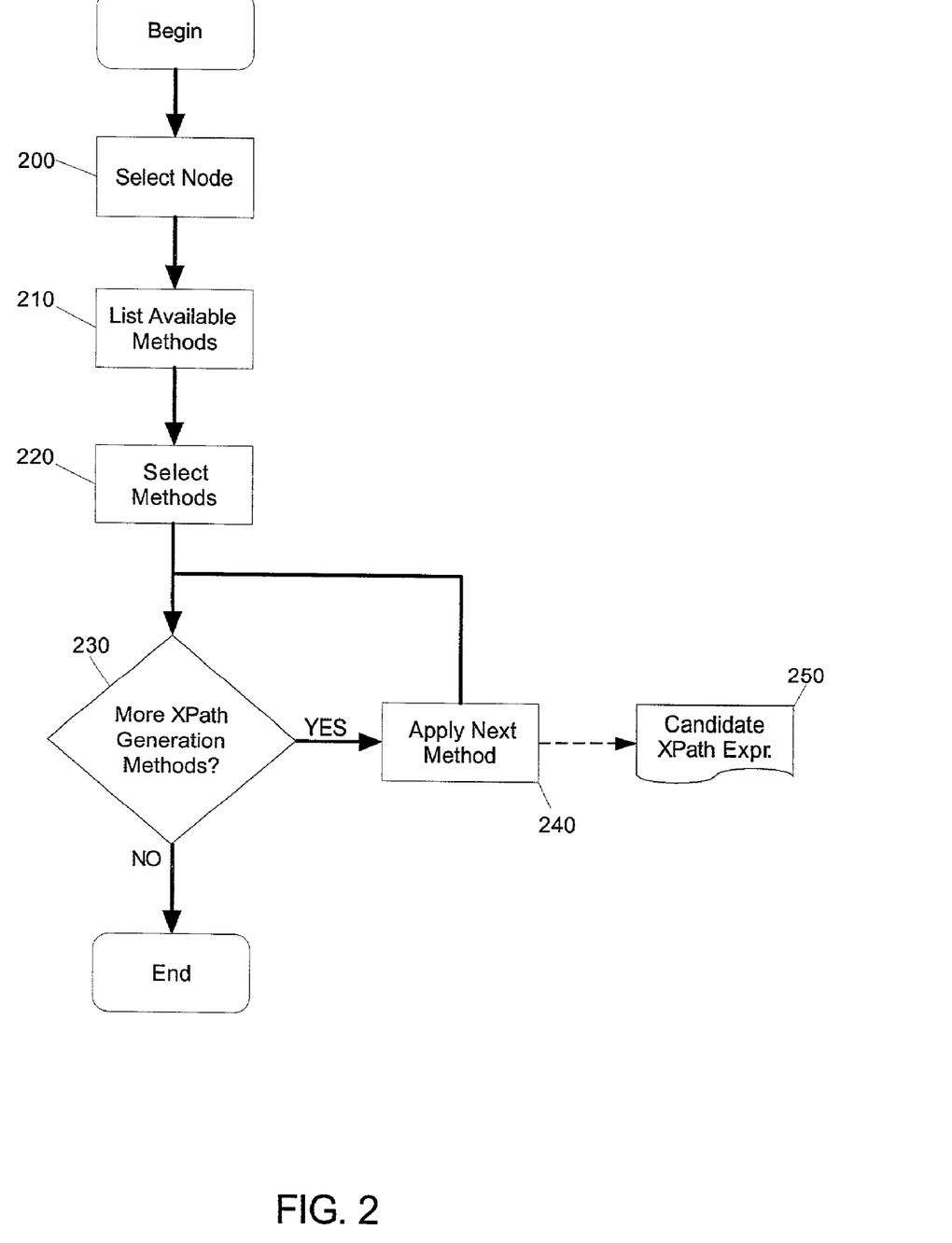
FIG. 2 is a flow chart illustrating a process for generating robust XPath expressions.

FIG. 2 is a flow chart illustrating a process for both for selecting particular ones of available XPath generation methods, and applying the selected methods in generating robust XPath expressions in accordance with the inventive arrangements. Beginning in block 200, a node in transcodable content can be selected for which a set of redundant XPath expressions can be generated. The redundant XPath expressions can be generated using a variety of XPath generation methods, for example tag-specific methods, anchoring-based methods, and filtering methods.

In that regard, in block 210, a list of available XPath generation methods can be presented. The available generation methods can include any suitable XPath generation method, ranging from tag-specific methods which generate XPath expressions based upon tag attributes in markup, to generic methods which generate XPath expressions based not upon tag attributes, but upon other characteristics of the markup. Examples of generic methods include, but are not limited to cascading filtering methods and anchoring methods. In any event, in block 220 individual ones of the available XPath generation methods can be selected and, in blocks 230 and 240, each selected XPath generation method can be applied in succession in order to generate a redundant set of candidate XPath expressions 250.

Notably, a tag specific XPath expression generation methodology can express the location of a selected node according to traits associated with a markup language tag, for instance the HTML tag, "FORM" or the HTML tag "IMG". By comparison, an anchoring-based XPath generation methodology can express the absolute location of a selected node based upon a location relative to another node. Finally, a filtering technique for locating the selected node in transcodable content can include the successive application of XPaths the combination of which absolutely identify the selected node. In all cases, however, for each methodology applied, a candidate XPath expression 250 can be generated.

Figure 3A:
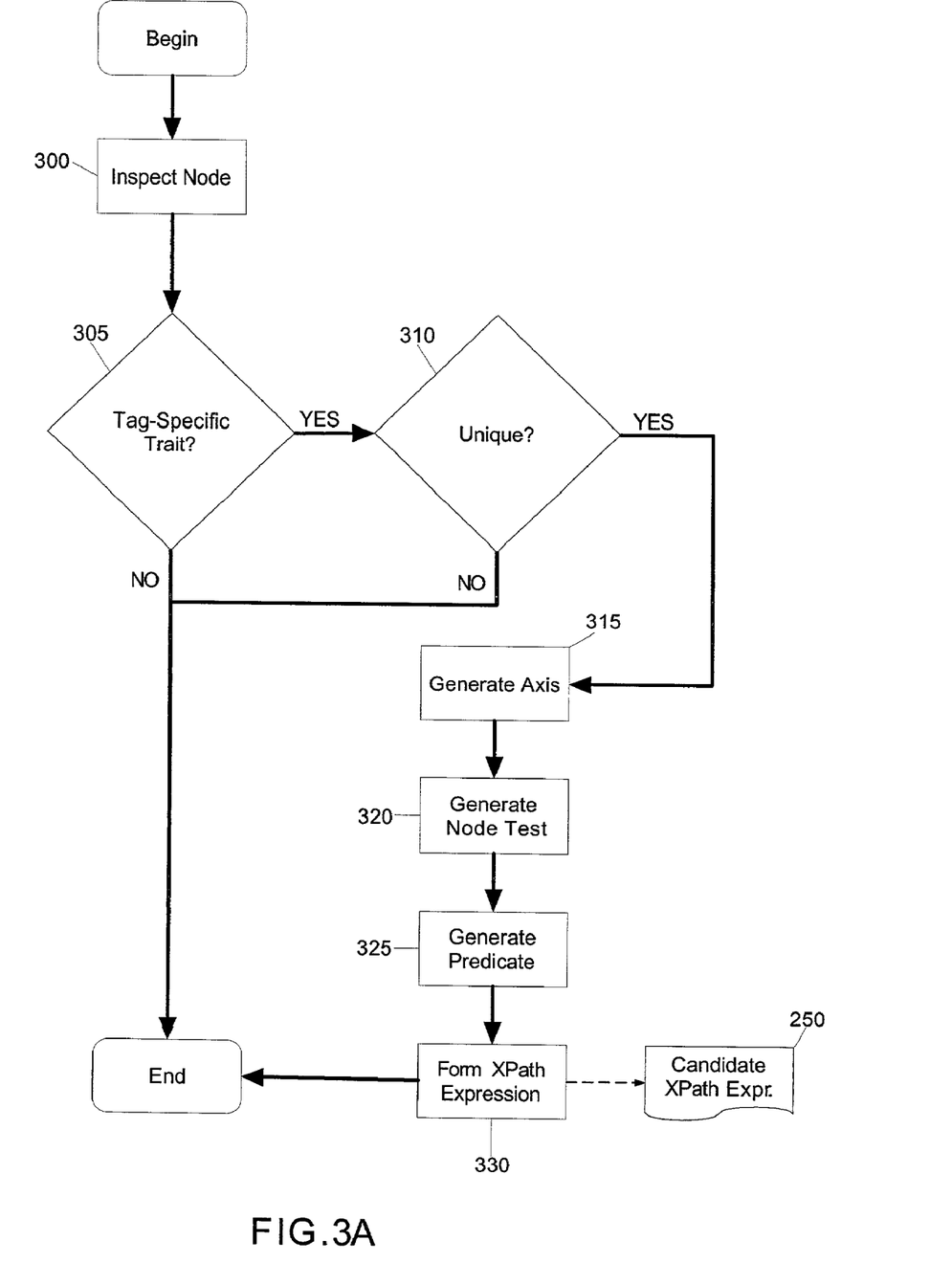
FIGS. 3A through 3C, taken together, are a flow chart illustrating a tag specific, anchoring and filtering process for generating robust XPath expressions; and, FIG. 4 is a flow chart illustrating a run-time process for using the robust XPath expressions generated in FIG. 2.
Figure 3B:
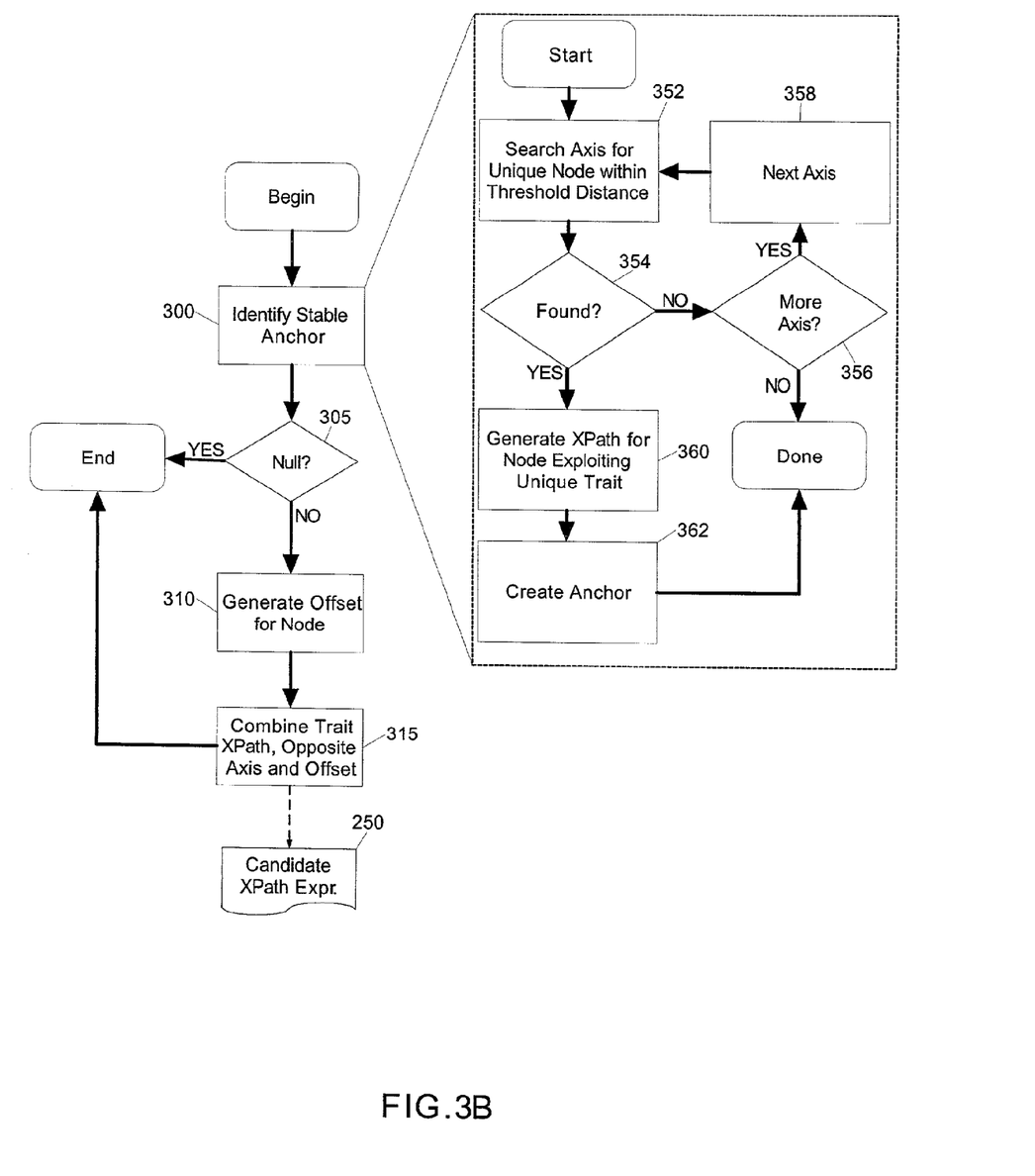
Figure 3C:
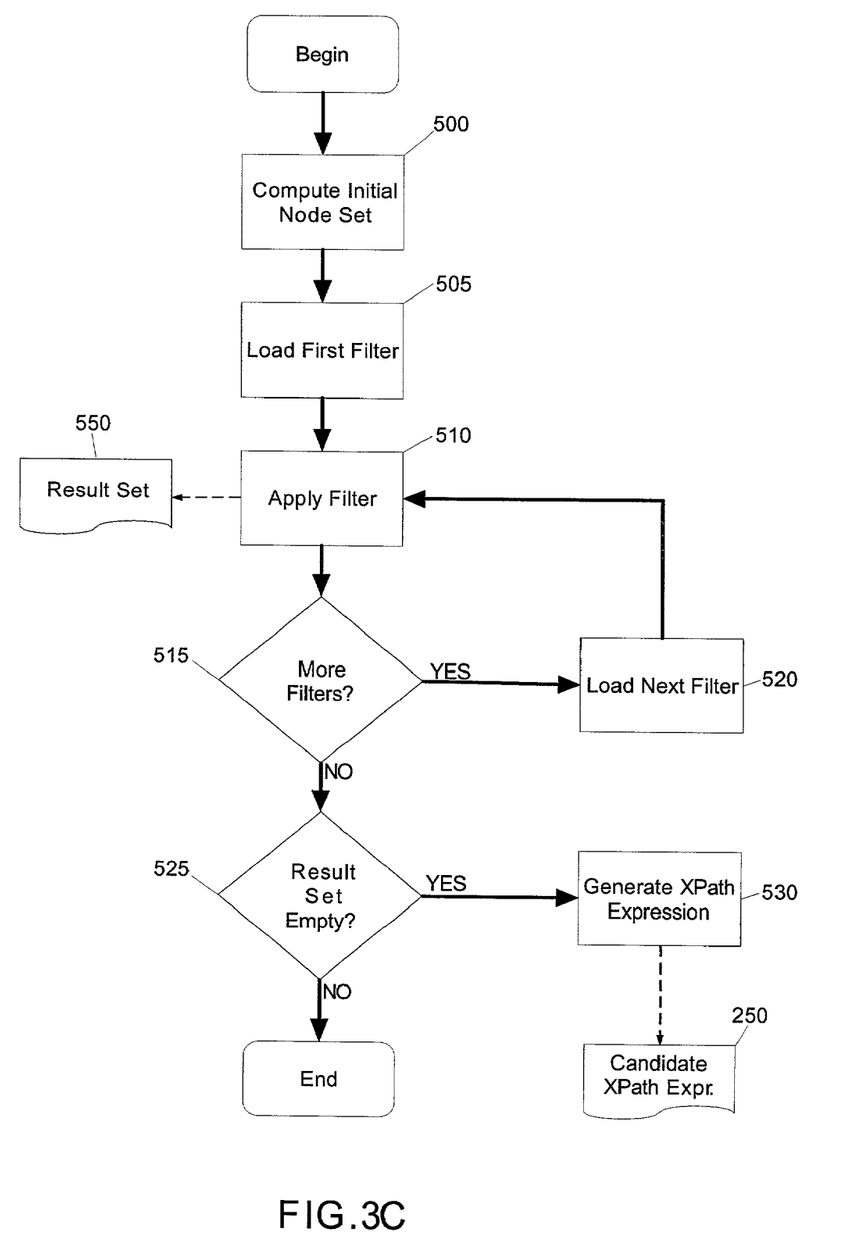

FIGS. 3A through 3C, taken together, illustrate a selection of XPath expression generation methodologies which can be applied in the process of FIG. 2. In particular, FIG. 3A is a flow chart illustrating a tag specific XPath expression generation methodology. Beginning in block 300, the selected node can be inspected for tag-specific traits. For instance, a tag-specific trait can include the ACTION value of an HTML FORM tag, a SRC attribute for an HTML IMG tag, the width attribute of an HTML IMG tag or a CAPTION attribute of an HTML TABLE tag. In fact, the tag-specific trait can be any value that is associated with the tag, such as the existence of a particular attribute associated with the tag or could also be a specific value of an attribute associated with the tag, through which it might be possible to uniquely identify an associated node. As a result, the invention is not limited in regard to the exemplary discussion of HTML and any markup language playing host to elements having tag-specific traits can suffice, including WML, XML, the many SGML variants, and the like.

Returning now to FIG. 3A, in block 305, if the node has a tag-specific trait, in block 310, the uniqueness of the tag-specific trait can be verified. In particular, it can be determined whether the selected tag-specific trait uniquely identifies the selected node and not other nodes in the transcodable content. For example, in the case of an HTML IMG tag the tag-specific source trait of "foo.gif" will more likely resolve to uniqueness, rather than the tag-specific width trait of 200 as many image nodes in an HTML document can have a width attribute value of 200, though it is less likely that more than one image node in an HTML document will have the source file attribute of "foo.gif".

If, in decision block 310, the uniqueness of the selected tag-specific trait can be verified, in block 315 an axis specification can be determined. Specifically, an axis specification can indicate a relative direction from an anchor node to a particular node. Hence, as is well-known in the art, an axis specification can be instrumental in providing a relative addressing of a node in transcodable markup. In that regard, an exemplary axis specification can include: child, descendant, parent, ancestor, preceding-sibling, preceding, following-sibling, and following. Still, the invention is not limited strictly to those axis specifications listed herein, and other axis specifications can be used to indicate the location of the selected node relative to an anchor.

In block 320, a node test can be generated for the selected node. The node test can be useful in producing a qualified name to confirm that the node includes the chosen tag, for instance the HTML "FORM" tag. Specifically, the node test can be a qualified name if the type of the selected node is the principal node type and has an expanded name equivalent to the expanded name specified by the qualified name. Notably, every axis has a principal node type. Moreover, if an axis can contain elements, then the principal node type is element. Otherwise, the principal node is the type of the nodes that the axis can contain.

In block 325 a predicate expression can be generated for the selected node. Importantly, the predicate expression can be constructed to evaluate to a boolean true for a particular tag-specific value. For instance, the HTML "FORM" tag can have a specific "action" attribute such as "action='form action'". Hence, the predicate expression can be configured to specify a particular form action. Finally, each of the axis, node test and predicate can be combined in block 330 to produce the candidate XPath expression 250 for the selected node.

FIG. 3B is a flow chart illustrating an anchoring method for producing a candidate XPath expression 250 for a selected node. In the anchoring method, an XPath expression can be generated which specifies the location of the selected node relative to a stable, "anchor" node. Importantly, the anchor can be selected based upon a node in the transcodable markup which would be likely to survive and maintain its positioning within the transcodable markup, notwithstanding changes thereto. The anchor can be considered a "stable anchor" programmatically based upon, for example, where the anchor node contains a unique trait which is likely not to change over time. Examples of such unique traits can include comment nodes or text nodes or displayable text headings and footings.

Beginning in block 300, a stable anchor can be identified in the transcodable markup. In particular, in block 352 a first axis of the selected node can be searched for a node having a uniquely identifiable trait. The unique trait can include, for example, a unique substring. Notably, only those nodes along the axis can be searched which are within a threshold number of steps away from the selected node. If, in decision block 354, no nodes are found within the threshold distance of the axis, in block 356 and 358, the next axis can be searched, and the process can repeat until no axes remain to be searched. Though the invention is not so limited, the axes can be searched in the following order: descendant, ancestor, previous-sibling, following-sibling, previous and following.

When a node has been located in the subject axis which has the specified unique trait, in block 360 an XPath can be generated for that node based upon the unique trait. For instance, a node type and predicate can be formed and combined into an XPath which uniquely specifies the identified trait. Subsequently, in block 362, an XPath can be generated for the identified anchor according to the trait XPath. If, in the process illustrated in blocks 352 through 358, a stable anchor cannot be identified along any axis, however, a null set can be returned and following decision block 305, the process can end. Otherwise, the anchoring process can continue in blocks 310 through 315.

Specifically, in block 310, an offset can be determined between the stable anchor and the selected node along the computed axis. Specifically, the offset can identify the distance in terms of depth between the selected node and the stable anchor along the computed axis. Many techniques can be applied in computing the offset. For instance, in one aspect of the invention, an axis joining the stable anchor and the selected node can be selected. A location step can be computed for each node in the selected axis, beginning with the node closest to the stable anchor. In particular, a location step can include both a node test identifying the name of the node and a predicate expression, such as an ordinal predicate. Essentially, the node test specifies the type of element in the node, while the predicate expression specifies the distance of the node from the stable anchor.

Notwithstanding, other types of offset generation techniques can suffice. In essence, any method for generating an offset can be applied so long as the offset uniquely identifies the location of the selected node relative to the stable anchor. In particular, it will be apparent that the offset can have a purely structurally defined location, a purely content defined location, or an amalgamation of structural and content constraints used to locate the selected node relative to the stable anchor. In any case, in block 315, the offset can be combined with the axis and the XPath expression of the stable anchor to produce the candidate XPath expression 250 for the selected node.

FIG. 3C is a flow chart which illustrates a cascading filtering process for generating a robust expression for selected node. Specifically, in a cascading filtering process, multiple XPath expressions can exploit traits of a selected node to iteratively refine the node set in order to test the ability of the multiple XPath expressions to uniquely identify the selected node. More particularly, each successive application of a filter can reduce the node set until no nodes remain in the node set. Hence, the combination of all filters can uniquely specify the selected node.

Beginning in block 500, an initial node set can be computed. The initial node set can include the set of all nodes in the transcodable markup excepting for the selected node. In one aspect of the present invention, the node set can be computed merely by requesting of an associated document object model (DOM) a set of all nodes absent the selected node. In blocks 505 and 510, a first filter can be applied to the node set. As is well-known in the art, filters can factor-out nodes which satisfy a specified property or structural uniqueness. In that regard, the filter can be one of a node step filter or a predicate filter. In particular, the node step filter can include an axis specification in combination with a node test. Thus, the node step filter can be one of a node type filter or a structure filter. The predicate filter, by comparison, can include an attribute value filter or an attribute type filter.

In any case, the filter can include an XPath expression fragment combined with an application function. The XPath expression fragment can define a portion of an XPath expression, for example a node test, axis specification, a predicate expression, or any combination thereof. The application function, by comparison, can produce a result set 550 based upon a set of nodes and a context node. Specifically, the result set 550 can be obtained by applying the XPath expression fragment to the set of nodes. The result set 550 produced by each filter application can be used as the input to subsequent filters. More particularly, in blocks 510 through 520, the process can repeat for subsequent chained filters until no filters remain to be applied. In decision block 525, if the result set 525 is empty, leaving only the selected node in the transcodable markup, then in block 530 each XPath expression fragment of each filter in the ordered sequence of filters can be concatenated to produce the candidate XPath expression. In contrast, if the result set is not empty, however, the filtering process will have failed to iteratively produce a refined candidate XPath expression 250.

Figure 4:
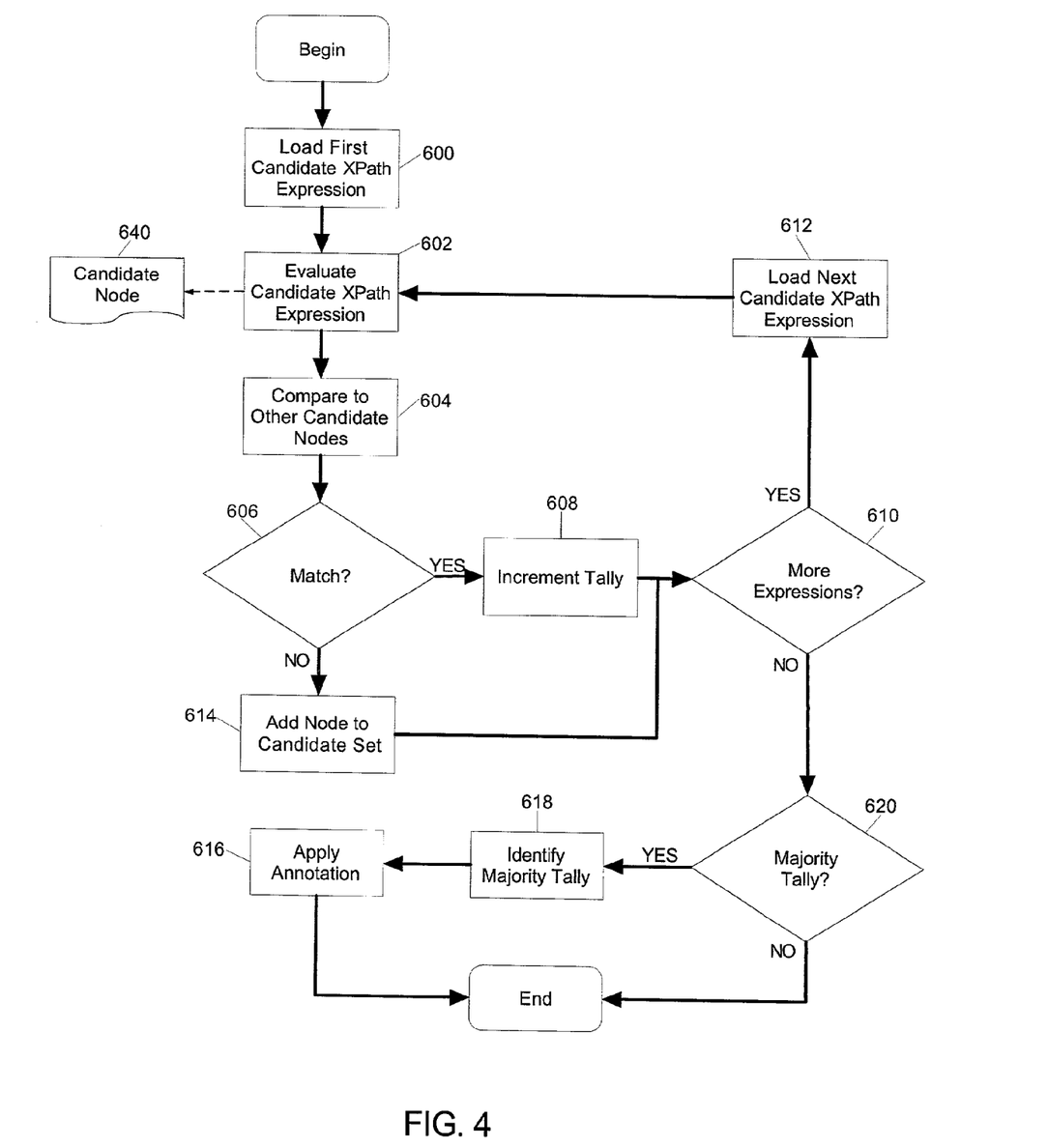

Importantly, in accordance with the inventive arrangements, a run-time XPath expression resolution process can be coupled with the XPath method selection and XPath expression generation process of FIG. 2 to redundantly albeit accurately resolve a suitable XPath expression for a selected node. FIG. 4 is a flow chart illustrating the run-time process for using the robust XPath expressions generated by the selected XPath generation methods of FIG. 2. Beginning in blocks 600 through 602, each candidate XPath expression 250 can be loaded and evaluated, each evaluation specifying a candidate node 640 in the transcodable markup. In block 604, the candidate node 640 can be compared to previously evaluated candidate nodes.

In block 606, if a match is detected, in block 608 a tally associated with the candidate node 640 can be incremented, indicating that multiple candidate XPath expressions resolve to the same candidate node. Otherwise, if a match is not detected in block 606, in block 614 the candidate node 614 can be added to the set of previously evaluated candidate nodes. In both cases, in block 610 if additional candidate XPath expressions 250 remain to be evaluated, the next candidate XPath expression 250 can be loaded in block 612 and the process can repeat in blocks 602 through 614.

In block 610, when no more candidate XPath expressions remain to be evaluated, in block 620, it can be determined from the tallies whether any particular candidate node has been specified by a notable number of XPath expressions, for instance a plurality or a majority of XPath expressions. If so, in block 618 the predominately specified candidate node can be identified and an associated annotation can be applied to the predominately specified candidate node in block 616. Otherwise, it can be assumed that the XPath expression is inherently unstable and the annotation can be skipped.

Importantly, by redundantly applying candidate XPath expressions to resolve the identity of a context node, transcoding accuracy can be markedly improved. Consequently, the XPath expression developer can be relieved of the burden of meticulously examining the content of transcodable markup to determine those unique characteristics that can be used to robustly identify nodes in the transcodable markup. Furthermore, robust XPath expressions can be authored with confidence regardless of the likelihood that the content of the transcodable markup will change over time. Finally, the XPath expression developer can finely control the XPath expression generation process by selectively applying those XPath expression generation methods deemed suitable under the circumstances.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer system for generating robust XPath expressions for a selected node in transcodable markup, comprising:
    a set of differing XPath expression generators;
    an interface through which at least one of said XPath expression generators can be selected; and,
    an XPath generator processor configured to apply each of said selected XPath expression generators to the selected node in the transcodable markup to produce a redundant set of robust XPath expressions configured to identify the selected node.

2. The system of claim 1, further comprising an XPath resolution processor configured to resolve each XPath expression in said redundant set, said resolutions identifying a set of candidate nodes, said XPath resolution processor identifying said selected node from among said set of candidate nodes based upon said XPath expressions resolving to said selected node more than any other node in said set of candidate nodes.

3. The system of claim 2, wherein said XPath resolution processor is coupled to a transcoding proxy configured to transcode transcodable markup based upon annotations comprising said redundant set of robust XPath expressions.

4. The method of claim 3, wherein said further selecting step comprises the step of selecting at least two XPath expression generation methods from the group consisting of a tag-specific methodology, an anchoring methodology and a cascading filtering methodology.

5. The system of claim 1, wherein said set of each said differing XPath expression generators comprise at least one of a tag-specific XPath expression generator, an anchoring XPath expression generator, and a cascading filtering XPath expression generator.

6. The system of claim 1, wherein said set of differing XPath expression generators are incorporated in a visual authoring tool configured to create annotations to the transcodable markup.

7. A computer-implemented method of generating robust XPath expressions comprising the steps of:
   selecting a node in transcodable markup;
   further selecting at least two XPath expression generation methods, each said method having a configuration for producing XPath expressions which uniquely identify nodes in transcodable markup; and,
   generating a redundant set of XPath expressions for said selected node using said further selected XPath expression generation methods.

8. The method of claim 7, further comprising the steps of:
   resolving each XPath expression in said set, said resolutions producing a set of candidate nodes; and,
   identifying said selected node from among said set of candidate nodes based upon said XPath expressions in said set resolving to said selected node more than any other node in said set of candidate nodes.

9. A machine readable storage having stored thereon a computer program for generating robust XPath expressions, said computer program comprising a routine set of instructions for causing the machine to perform the steps of:
   selecting a node in transcodable markup;
   further selecting at least two XPath expression generation methods, each said method having a configuration for producing XPath expressions which uniquely identify nodes in transcodable markup; and,
   generating a redundant set of XPath expressions for said selected node using said further selected XPath expression generation methods.

10. The machine readable storage of claim 9, further comprising the steps of:
    resolving each XPath expression in said set, said resolutions producing a set of candidate nodes; and,
    identifying said selected node from among said set of candidate nodes based upon said XPath expressions in said set resolving to said selected node more than any other node in said set of candidate nodes.

11. The machine readable storage of claim 9, wherein said further selecting step comprises the step of selecting at least two XPath expression generation methods from the group consisting of a tag-specific methodology, an anchoring methodology and a cascading filtering methodology.

* * * * *